May 27, 1958 C. E. SPAETH 2,836,392
DISC VIBRATION DAMPING MEANS
Filed June 3, 1953
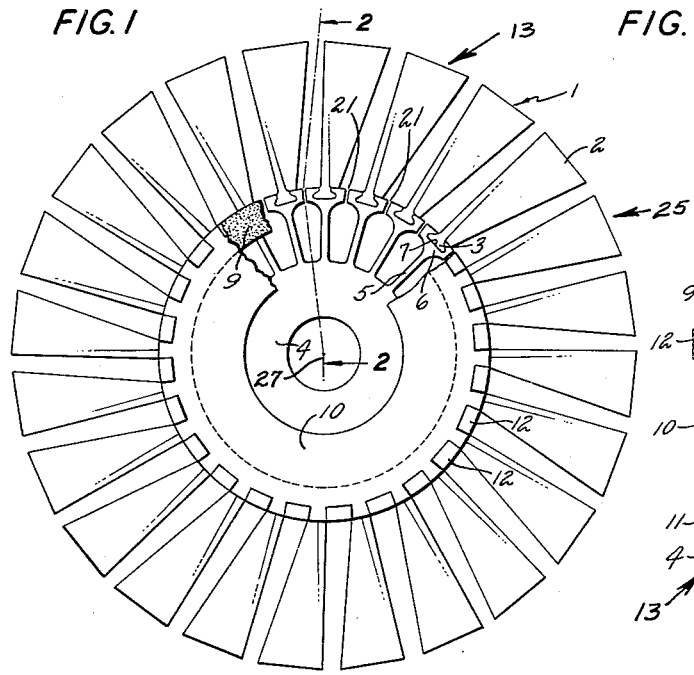
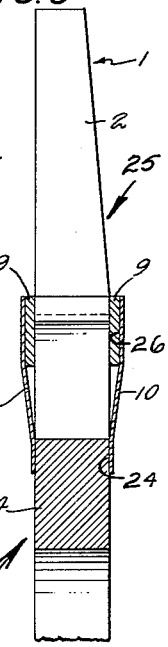
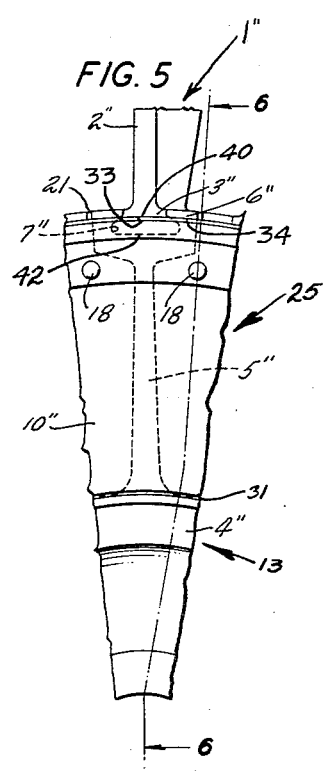
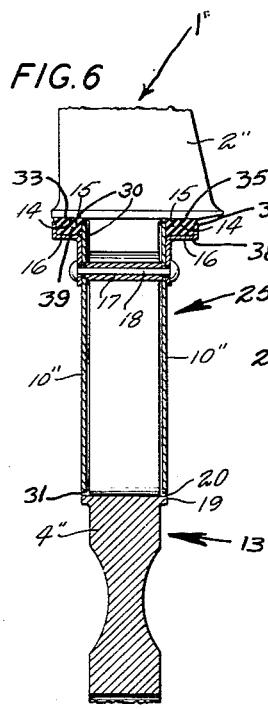
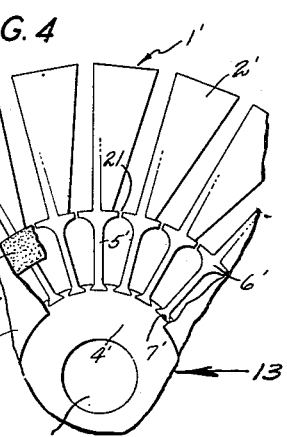
INVENTOR
CHARLES E. SPAETH
BY Charles A. Warren
ATTORNEY

United States Patent Office 2,836,392
Patented May 27, 1958

2,836,392

DISC VIBRATION DAMPING MEANS

Charles E. Spaeth, East Hartford, Conn., assignor to United Aircraft Corporation, East Hartford, Conn., a corporation of Delaware Application June 3, 1953, Serial No. 359,314

7 Claims. (Cl. 253—77)

This invention relates to damping of vibrations and more particularly to the damping of vibrations in the blades of a turbine or compressor.

In the past, damping means have been used to combat these vibrations but the damping means have either required increased machining of the blade which increases time and expense of blade manufacture or an attachment to the blade and such an attachment usually causes aerodynamic efficiency losses.

An object of this invention is to render the natural frequency of the blade of no concern in blade design thereby making possible great reductions in the weight of the compressor or turbine.

An object of this invention is to provide a blade vibration damper which will not complicate blade manufacture nor require attachments to be made to the blade to provide the damping.

An object of this invention is to provide a blade vibration damper which will perform its damping function without disturbing the gas flow over the blading and without introducing severe windage losses.

An object of this invention is to provide a blade vibration damper which will be so positioned as to be effective to damp vibrations caused by any of several lower modes of bending vibration.

An object of this invention is to provide a blade vibration damper which will damp both bending and torsional vibrations.

An object of this invention is to provide a blade vibration damping means which will also serve to restrain the blade from axial movement.

Further features and advantages of the invention will more fully appear from the following detailed description taken in connection with the accompanying drawings in which:

Fig. 1 is a side view of a rotor incorporating the invention.

Fig. 2 is a fragmentary sectional view of the rotor substantially along line 2—2 of Fig. 1.

Fig. 3 is a fragmentary sectional view similar to Fig. 2 showing a modification.

Fig. 4 is a fragmentary side view similar to Fig. 1 showing a modification.

Fig. 5 is a fragmentary side view of a further modified form of rotor.

Fig. 6 is a sectional view through the rotor of Fig. 5 on line 6—6.

Referring to Fig. 1, a row of blades 1 each of which has an aerodynamic or airfoil section 2 and a root section 3 are attached to a relatively small diameter hub or disc 4 through flexural elements 5 projecting radially outward from the hub. Blades 1, disc 4, and flexural elements 5 form rotor unit 13. In this construction, the elongated flexural elements 5 are integral with the disc 4 and are substantially equally spaced circumferentially of the periphery of the disc 4. The outer end of each flexural member has a platform section 6 with a slot 7 therein corresponding in shape to the root section 3 of the blade. When the blades vibrate, relative motion occurs between the blades and the other parts of the rotor assembly 25, which comprises rotor unit 13, cover plates 10 and damper 9, and the bending taking place in the flexural members. Rotor assembly 25 rotates about axis 27.

Vibration dampers are utilized to damp the vibrations of the blades. As shown in Fig. 2, vibration dampers 9 in the form of annular rings, extend around the full periphery of the flexural members 5 and blade root sections 3 such that the outer diameter of the annular ring forming the damper is approximately equal to the diameter of the outer surfaces of the slotted platform sections 6 and blade root sections 3 or the inner aerodynamic diameter of the gas flow region to insure that the dampers do not cause any interference with gas flow through the rotor assembly 25. These dampers 9 are located on each side of the rotor unit 13 and each damper is held in place against the slotted platform sections 6 and blade root sections 3 by a cover plate 10, shaped as an annular ring, which is securely attached to the hub 4 by a ring 11 the parts being suitably held together as by brazing, welding or a mechanical attachment. With the dampers 9 held in this position, they provide a frictional drag on the outer ends or slotted platform sections 6 of the flexural members 5 and blade root sections 3 and also function to retain the blades 1 axially within the rotor unit 13, since the axial dimension of slotted platform sections 6 and blade root sections 3 are equal.

In the arrangement shown in Figs. 1 and 2, the dampers are made of a frictional material such as used in brake linings for frictional damping of the vibrations in the blades or flexural members. Instead of using a frictional material, the damping material may be a resilient material such as rubber bonded to either or both of the cover plate 10 and the rotor unit 13. In either event the rubber material which damps in shear, as explained hereinafter, or the frictional material, uses the relative motion between the blade and the cover plates when the blade is vibrating to effect damping of both bending and torsional vibrations. For instance, as vibration causes a particular joined blade root section 3 and slotted platform section 6 to move circumferentially relative to the remainder of rotor assembly 25, the abrasive damper material is going to impede this motion and hence damp the vibration by bearing against and providing a friction drag and hence motion resistance to the particular root 3 and platform section 6. In similar fashion, the resilient damper material will be placed in shear by the relative motion which occurs between the vibrating blade root section 3 and the slotted platform section 6 with respect to the disc 4 and cover plate 10 to provide the desired resistance to blade root and slotted platform section vibration motion since the surface of the resilient ring 9 which bears against the vibrating blade root 3 and slotted platform section 6 will move therewith while the surface of the resilient ring 9 which bears against or is attached to the cover plate 10 remains stationary relative thereto, thereby establishing a shear action in the resilient ring damper to resist and hence damp the vibratory motion of the vibrating blade root section and slotted platform sections relative to the cover plate 10 and disc 4.

To cause the cover plates 10, with the dampers 9 thereon, to bear more securely against the sides of the rotor unit 13 at the slotted platform sections 6 and blade root sections 3 when a frictional damper is used, or to compress a resilient damper thereagainst, lugs 12 may be attached to the outer periphery of the cover plates as shown in Figs. 1 and 2 or the inner peripheries of the cover plates may be attached to the hub 4 without the spacing ring 11 as shown in Fig. 3 so that centrifugal force resulting from the rotation of the rotor assembly 25 will cause the dampers 9 to engage more securely against the side surfaces of the rotor unit 13. This aid to frictional engagement utilizes the principle that centrifugal force tends to cause rotated objects to seek a common plane outboard of the center of rotation or the point or plane of retention. Referring to the cover plate 10 on the right in Fig. 2, we see that cover plate 10 is retained in position at point or in plane 21 while the center of gravity of lug 12 is to the right of point or plane 21, or substantially at point 22. As cover plate 10 revolves with hub 4, centrifugal force will tend to cause lug 12 to move to the left until points 21 and 22 are in the same plane, thereby applying a force to cause damper 9 to bear harder against blades 1 and platforms 6. Now referring to the right hand cover plate 10 in Fig. 3, we see that plate 10, which is an annular ring, attaches to hub 4 at point or in plane 24 while plate 10 attaches to damper 9 at point 26, which lies to the right of point 24. As plate 10 revolves with hub 4, centrifugal force tends to cause plate 10 to straighten out or lie in a single plane so that point 26 tends to move to the left to be in the same plane as point 24, thereby applying a force to cause damper 9 to bear harder against blades 1 and platforms 6. It may be noted, further, that the use of a smooth cover plate as in Fig. 3 which extends from hub 4 to the outer periphery of the flexural members 5 and thereby encloses these members, eliminates aerodynamic loss due to windage.

In Fig. 1, the flexural elements 5 are shown as integral with the hub 4, with the blade root section 3 engaging the flexural element slotted platform section 6 so that flexural element 5 joins blades 1 to disc 4. In Fig. 4 the flexural element 5' is integrally attached to the blade 1' to permit the point of attachment to be made nearer to the center of rotation of the rotor assembly 25. In this embodiment, the platform 6' is a part of the blade 1' and the slots 7' are located in the periphery of the hub 4'. In this arrangement the blade 1' has the airfoil section 2' and the platform section 6' as well as the flexural section 5' are formed integral therewith.

A modified form of damper is shown in Figs. 5 and 6 in which the blade 1" has a root section 3" received in the slot 7" in the platform section 6" carried by the outer end of the flexural member 5" on the periphery of the hub 4". In this arrangement, the platform sections 6" and the root sections 3" of the blade are undercut or the blade root sections have radially inwardly facing shoulders 33 and 35 at their leading and trailing edges, respectively, while slotted platform sections have corresponding radially inwardly facing shoulders 34 to provide substantially cylindrical but interrupted surfaces 14 for engagement by annular ring 15 of resilient damping material carried by cover plates 10" preferably through the medium of clamping rings 16. Clamping rings 16 may be attached to cover plates 10" either integrally or by any convenient means such as brazing, soldering, or by a mechanical attaching means such as rivets 18. Clamping rings 16 have a first portion 37 which is spaced axially from either the cover plate 10" and a second portion 38 which is spaced radially inwardly from blade shoulders 33 and 35 so that clamping means portions 37 and 38, blade root section and slotted platform section shoulders 33, 34 and 35, and cover plates 10", form and define an annular chamber 39 at each the leading and trailing edge of rotor unit 13. The blade and platform undercut portions are shown at 30. In this arrangement, the cover plates 10" and clamping rings 16 are held in suspension and out of contact axially with or from the flexural members 5", blades 1", and disc 4", by spacer tubes 17 surrounding rivets 18 which join cover plates 10" in spaced relation and cooperate with resilient dampers 15 to support and hold the cover plates 10" and the clamping rings 16 in suspended position with respect to and axially spaced from and on each side of blades 1", flexural members 5" and disc 4". In this arrangement, cover plates 10" and rings 16 do not contact blade 1", flexural members 5" nor hub 4" when the assembly is rotating, therefore parts 10" and 16 are held in suspension thru resilient damper 15, which cooperate with spacer tubes 17 and rivets 18 to support parts 10" and 16 by engaging these parts as well as blade 1", and flexural members 5". It will be obvious that to cause dampers 15 to bear against cylindrical surfaces 14, to perform a cover plate support function and damp vibrations, the volume of dampers 15 must be slightly larger than the volume of cross-sectional area than the annular chambers 39 described supra which are formed by blade root sections and slotted platform section shoulders 33, 34, 35 and, cover plates 10", and clamping rings 16 so that cover plates 10" and rings 16 can be held in suspension and axially away from flexural members 5", blades 1", and disc 4" and be supported only by dampers 15, spacing tubes 17 and rivets 18 to cause vibration damping by placing compressed resilient dampers 15 in shear during rotation due to the inertia of cover plates 10" and rings 16, as described hereinafter. As shown in Fig. 5 these rivets 18 are located between or out of contact with adjacent flexural members 5". In this arrangement the hub 4" may have common outer diameter shoulders 19 projecting from opposite sides thereof for engagement with the inner periphery 20 of the cover plates so that the plates will be held in an approximately concentric position, a clearance 31 being provided to permit a small amount of movement between the cover plates 10" and the hub 4". The damping action in this arrangement results from the movement of the rubber of the damper 15 in shear. The damping action occurs as a result of the relative motion which occurs between the individual blades and the cover plates due to inertia of the cover plates and the attached clamping rings, spacer tubes and rivets. The blade vibration damping occurs as follows. Consider that a vibration, not rotation, causes blade 1", blade root 3" and/or flexure members 5" to move to the right. This rightward movement of these parts will cause the portion 40 of resilient damper 15 in contact with the parts to move to the right also. Since cover plates 10" and rings 16 are not attached to the rightward moving parts except thru resilient damper 15, they must be moved to the right by resilient damper 15. Due to the inertia to movement or counterweight action of suspended parts 10" and 16, they will resist rightward movement and, in effect, will place a relative leftward movement on the portion 42 of resilient damper 15 which is in contact with parts 10" and 16, hence, placing resilient damper 15 in shear. This resistance to rightward movement by parts 10" and 16, manifest thru a shear force in damper 15, will impede the rightward vibration movement of blade 1", root 3" and flexural member 5", thereby dampening the vibration movement. When parts 1", 3" and 5" are moved leftwardly in vibration, a similar retarding force, but in opposite direction, will be imposed by the inertia of suspended parts 10" and 16, manifest thru a shear force in damper 15. Since shoulders 33, 34, and 35 of blades 1" and flexural members 5" contact damper rings 15 as do clamping rings 16, which are attached to cover plates 10", cover plates 10" cooperate with rings 16 and damper rings 15 to limit the axial movement of blades 1" in flexural elements 5".

In blade design there are many types of stresses which must be considered. Of these, the one that often causes the most trouble is the vibratory stress. If a blade could be designed without vibratory stress to contend with, the steady stress which could be tolerated would be much higher for vibratory stresses combine with the steady stress and may cause a failure. The use of this blade damping means would materially reduce the vibratory stress and thereby permit a blade to be designed with a greater steady bending stress. This would permit the use of a lightweight material for blades such as aluminum which, can tolerate less vibratory stress or it would permit the use of a blade made of heavier material but with shortened chord and/or thickness, either of which would reduce the weight of the powerplant materially.

It will be understood that to permit proper damping space 21 shown in Figs. 1, 5, and 4, must be left between adjacent blades and the size of such space must be so chosen that each blade is able to move through its maximum tangential motion of vibration.

It will be readily apparent to one skilled in the art that, because of its radial location, this damping system is effective in combating the first several modes of bending vibration as well as torsional vibration. This permits designing the blade without regard to natural frequency (although as a practical matter it should be borne in mind that damper life would be extended by avoiding continuous operation in resonance) thus effecting a saving in powerplant weight.

It is to be understood that the invention is not limited to the specific embodiment herein illustrated and described, but may be used in other ways without departure from its spirit as defined by the following claims.

I claim:

1. A rotor assembly rotatable about an axis and comprising a relatively small disc having axially directed shoulders with common outer diameters projecting from its periphery at each side thereof, a plurality of elongated flexural members substantially equally spaced circumferentially about the periphery of said disc and extending substantially radially therefrom, each of said flexural members having a slotted platform section at its outer end spaced circumferentially from the platform sections of adjacent flexural members, a plurality of blades each having a root section engaging a slot in one of said flexural member slotted platforms such that said flexural members join said blades to said disc, said blade root sections and said slotted platform sections being of equal axial dimension at their radially inner ends and having radially inwardly facing shoulders at their leading and trailing edges which form substantially cylindrical but interrupted surfaces at said leading and trailing edges, a cover plate in the form of an annular flat plate ring located adjacent each of said edges of said radially inner ends of said blade root sections and said platform sections and directed inwardly to cover said flexural members to prevent aerodynamic windage losses due to the rotation thereof and culminating in an inner diameter slightly larger than said common outer diameter of said shoulders, a clamping ring attached to each of said cover plates and each clamping ring having a first portion spaced axially from said cover plate to which it is attached and further having a second portion spaced radially inwardly from said slotted platform section and blade root section shoulders so that said clamping ring first and second portion, said slotted platform section and blade root section shoulders, and said cover plate define an annular chamber at each of said edges of said blade root sections and said flexural member platform sections, a resilient vibration damper in the form of an annular ring carried in each of said annular chambers and bearing against said slotted platform section and blade root section shoulders and clamping ring, and axially extending connecting and spacing means having greater axial dimension than said equal axial dimension of said inner radial ends of said blade root sections and said slotted platform sections and the maximum axial dimension of said elongated flexural members joining said cover plates to each other and axially spacing said cover plates apart a distance greater than said equal axial dimension of said inner radial ends of said blade root sections and said slotted platform sections and the maximum axial dimension of said elongated flexural members and cooperating with said dampers to support said cover plates out of contact with said disc, blades, and flexural members.

2. A rotor assembly comprising a relatively small disc, a plurality of elongated flexural members substantially equally spaced circumferentially about the periphery of said disc and extending substantially radially from said disc, each of said flexural members having a slotted platform section at its outer end, a plurality of blades each having a root section engaging a slot in one of said flexural member slotted platform sections such that said flexural members join said blades to said disc, said blade root sections and said slotted platform sections having radially inwardly facing shoulders at their leading and trailing edges which form substantially cylindrical but interrupted surfaces at said leading and trailing edges, cover plates adjacent each side of said disc and extending radially outward to be adjacent said blade root sections and said platform sections to cover said flexural members and thereby eliminate aerodynamic windage losses and to limit the axial movement of said blades, a clamping ring attached to each of said cover plates and having a first portion spaced axially from said cover plate to which it is attached and further having a second portion spaced radially inwardly from said slotted platform section and said blade root section shoulders so that said clamping ring first and second portion, said slotted platform section and said blade root section shoulders, and said cover plates define an annular chamber on each of said edges of said blade root sections and said flexural member platform sections, spacing means joining said cover plates in spaced relation with respect to each other and a sufficient distance apart to be out of axial contact with said disc, flexural members and blades, vibration dampers in the form of resilient annular rings of greater cross-sectional area than the cross-sectional area of said annular chambers supported in compression in said annular chambers with at first portion of each ring bearing against said radially inwardly facing shoulders of said blade root sections and said slotted platform sections and with a second portion of each ring bearing against one of said clamping rings to cooperate with said cover plates in limiting the axial movement of said blades and to cooperate with said spacing means to support said cover plates and clamping means in suspension and out of axial contact with said disc, flexural members and blades such that blade and flexural member vibrations are damped by said dampers due to the shear force set up therein by vibration imposed motion in said blade root sections and said flexural member platform sections which motion imparts a motion to said first damper ring portion which is opposed by a resistance to motion from said second damper ring portion which is prevented from moving by the inertia of said cover plates and said clamping means and hence a vibration damping force is imparted to said blades and flexural members due to the establishment of a shear motion resisting force in said damper rings caused by the vibration imposed relative movement between said damper ring first and second portions.

3. A rotor assembly rotatable about an axis comprising a relatively small diameter disc, a plurality of substantially equally spaced flexural members extending radially from said disc and each having a substantially axially slotted platform section in its outer periphery, a plurality of blades having root sections mounted in said slotted platforms of said flexural members such that said flexural members connect said blades to said disc, cover plates in the form of radial annular flat rings extending radially outward from each side of said disc to said blade root sections and said platform sections, said blade root sections and said slotted platform sections being of equal axial dimension at their radially inner ends and having radially inwardly facing shoulders at their leading and trailing edges forming substantially cylindrical but interrupted surfaces, spacing means comprising hollow tubes located between said flexural members and extending axially beyond each end of said radially inner ends of said blade root sections and said flexural members holding said cover plates in spaced relation axially with respect to each other and out of contact with said disc, said blades and said flexural members, a clamping ring attached to each of said cover plates and having a first portion spaced axially from said cover plate to which it is attached and further having a second portion spaced radially inwardly from said slotted platform section and said blade root section shoulders so that said clamping ring first and second portion, said slotted platform section and said blade root section shoulders and said cover plates define an annular chamber on each of said edges of said blade root sections and said flexural member platform sections, attachment means attaching said cover plates to each other and said clamping rings to said cover plates comprising rivets passing through said spacing means, resilient vibration dampers each located in compression within one of said annular chambers and bearing against one of said clamping rings and said radially inwardly facing shoulders of each of said root sections of said blades and said platform sections of said flexural members and cooperating with said spacing means and said attachment means to support said cover plates in suspension axially from said disc, flexural members and blades and to damp vibration motion in said blades and flexural members.

4. A rotor assembly rotatable about an axis comprising a relatively small disc, a plurality of elongated flexural members attached to and substantially equally spaced circumferentially about the periphery of said disc and extending radially therefrom and each having a platform section at the outer periphery thereof, a plurality of blades with root sections having the same axial dimension as and attached to said flexural member platform sections, spacer rings attached to each side of said disc and having an axial dimension, cover plates in the form of flat annular rings having an outer diameter and having an inner diameter attached to said spacer rings on each side of said disc and extending radially outwardly therefrom and culminating at said outer diameter adjacent said blade root sections and said flexural member platform sections thereby covering said flexural members to prevent aerodynamic windage losses due to the rotation thereof, and said cover plates further being uniformly spaced axially from said disc, flexural members, and blades due to the axial dimension of said spacer rings, vibration dampers in the form of annular rings having outer diameters substantially equal to said outer diameters of said cover plates and located between said cover plates and said blade root sections and said flexural member platform sections and attached to said cover plaes, said vibration dampers being of sufficient axial dimension that when supported by said cover plates said vibration dampers bear against said blade root sections and said flexural member platform sections to axially position same and damp vibratory motion of said blade root sections and said flexural member platform sections relative to said cover plates by providing a resistance to said vibratory motion due to the relative stationary positioning of said damper rings by said cover plates.

5. A rotor assembly rotatable about an axis comprising a relatively small disc, a plurality of elongated flexural members substantially equally spaced about the periphery of said disc and extending substantially radially from said disc, each of said flexural members having a slotted platform section at its outer end, a plurality of blades each having a root section engaging a slot in one of said flexural member platform sections such that said flexural members join said blades to said disc, said blade root sections and said platform sections being of the same axial dimensions at their radially inner ends and having radially inwardly facing shoulders at their leading and trailing edges to form substantially cylindrical but interrupted surfaces, cover plates in the form of annular rings having smooth exterior surfaces located adjacent each side of said disc and extending radially outward from said disc to said blade root sections and said platform sections to cover said flexural members and thereby prevent windage losses during rotation of said rotor assembly, a clamping ring attached to each of said cover plates and having a first portion spaced axially from said cover plate to which it is attached and further having a second portion spaced radially inwardly from said slotted platform section and said blade root section shoulders so that said clamping ring first and second portion, said slotted platform section and said blade root section shoulders, and said cover plates define an annular chamber on each of said edges of said blade root sections and said flexural member platform sections, resilient vibration dampers in the form of annular rings carried in said annular chambers and bearing against said cylindrical surfaces and said clamping rings, spacing means joining and holding said cover plates in spaced relation axially from each other and axially away from said disc, said flexural members and said blades such that said cover plates and clamping rings are held in suspension and are supported only by said spacing means and said dampers to cause said dampers to resist vibration imposed motion and thereby dampen vibrations in said blades and flexural members.

6. A rotor assembly rotatable about an axis comprising a relatively small disc, a plurality of elongated flexural members attached to and substantially equally spaced circumferentially about the periphery of said disc and extending radially therefrom and each having a platform section at the outer periphery thereof, a plurality of blades with root sections having the same axial dimension as and attached to said flexural member platform sections, spacer rings attached to each side of said disc and having an axial dimension, cover plates in the form of flat annular rings having an outer diameter and having an inner diameter attached to said spacer rings on each side of said disc and extending radially outwardly therefrom and culminating at said outer diameter adjacent said blade root sections and said flexural member platform sections, thereby covering said flexural members to prevent aerodynamic windage losses due to the rotation thereof, and said cover plates further being uniformly spaced axially from said disc, flexural members, and blades due to the axial dimension of said spacer rings, vibration dampers in the form of annular rings having an axial dimension substantially equal to said axial dimension of said spacer rings and having outer diameters substantially equal to said outer diameters of said cover plates and attached to said cover plates and located between said cover plates and said blade root sections and said flexural member platform sections and bearing against said blade root sections and said flexural member platform sections to axially position same and damp vibratory motion of said blade root sections and said flexural member platform section relative to said cover plates by providing a resistance to said vibratory motion due to the relative stationary positioning of said damper rings by said cover plates, and lugs attached to the outer periphery of said cover plates and on the antidisc side thereof to be farther axially displaced from said blade root sections and said flexural member platform sections than said cover plates so that said lugs will cause said damper rings to bear against said blade root sections and said flexural member platform sections due to the action of said lugs attempting to become coplanar with said cover plates during rotation.

7. A rotor assembly rotatable about an axis comprising a relatively small disc, a plurality of elongated flexural members attached to and substantially equally spaced circumferentially about the periphery of said disc and extending radially therefrom and each having a platform section at the outer periphery thereof, a plurality of blades with root sections having the same axial dimension as and attached to said flexural member platform sections, cover plates in the form of flat annular rings having an outer diameter and having an inner diameter attached to each side of said disc and extending outwardly therefrom while tapering away from said flexural members then culminating at said outer diameter adjacent, parallel to, and axially spaced from said blade root sections and said flexural member platform sections, thereby covering said flexural members to prevent aerodynamic windage losses due to the rotation thereof, vibration dampers in the form of annular rings having an axial dimension substantially equal to said axial spacing between said cover plates and said blade root sections and said flexural member platform sections and having outer diameters substantially equal to said outer diameters of said cover plates and located between said cover plates and said blade root sections and said flexural member platform sections, said vibration dampers attached to said cover plates and cause by the rotation thereof to bear against said blade root sections and said flexural member platform sections to axially position same and damp vibratory motion of said blade root sections and said flexural member platform section relative to said cover plates by providing a resistance to said vibratory motion due to the relative stationary positioning of said damper rings by said cover plates.

References Cited in the file of this patent

UNITED STATES PATENTS

| | | |
|---|---|---|
| 2,436,087 | Benson | Feb. 17, 1948 |
| 2,537,739 | Chilton | Jan. 9, 1951 |
| 2,595,829 | Dean | May 6, 1952 |
| 2,631,680 | Compte | Mar. 17, 1953 |
| 2,664,240 | Gorton | Dec. 29, 1953 |

FOREIGN PATENTS

| | | |
|---|---|---|
| 595,643 | Great Britain | Dec. 11, 1947 |
| 628,036 | Great Britain | Aug. 22, 1949 |
| 651,449 | Great Britain | Apr. 4, 1951 |
| 667,979 | Great Britain | Mar. 12, 1952 |
| 670,665 | Great Britain | Apr. 23, 1952 |